Jan. 3, 1967  W. G. WALTERMIRE  3,295,580

FASTENER HAVING CONCAVE LOCKING FINS

Filed July 6, 1964

INVENTOR.
WILLIAM G. WALTERMIRE
BY Williams, David,
Hoffmann & Yount
ATTORNEYS

United States Patent Office 3,295,580
Patented Jan. 3, 1967

3,295,580
FASTENER HAVING CONCAVE LOCKING FINS
William G. Waltermire, Seven Hills, Cleveland, Ohio, assignor to The Lamson & Sessions Co., Cleveland, Ohio, a corporation of Ohio
Filed July 6, 1964, Ser. No. 380,409
5 Claims. (Cl. 151—37)

The present invention relates to fasteners and more particularly to a fastener having a head provided with a locking means for effecting a locking relationship between the head and the adjacent host member.

One of the principal objects of the present invention is to provide a bolt, for use in structural or similar joints, having a head provided with a novel locking means which prevents the bolt from turning or slipping.

Another object of the present invention is to provide a novel locking bolt for use in connecting structural members together having a head whose undersurface is provided with a plurality of inwardly concave fins or projections, as viewed from the periphery thereof, which embed within the adjacent structural member and prevent the bolt head from turning or slipping.

Yet another object of the present invention is to provide a novel locking bolt for use in connecting structural members together having a head whose undersurface is concave and whose outer periphery comprises, as viewed from the undersurface thereof, alternately spaced convex and concave surfaces, and provided with fins extending beneath the undersurface and along the concave surfaces which are adapted to embed within the adjacent structural member and prevent the bolt head from turning or slipping.

A still further object of the present invention is to provide a new and improved locking bolt having a head provided with concave fins, as viewed from the periphery thereof, which are formed by swaging or cold-flowing metal by upsetting the outer periphery of the head.

Further objects and advantages of the present invention will be apparent from the following detailed description of the preferred embodiment thereof made with reference to the drawings forming a part of this specification, and in which.

Figure 1:
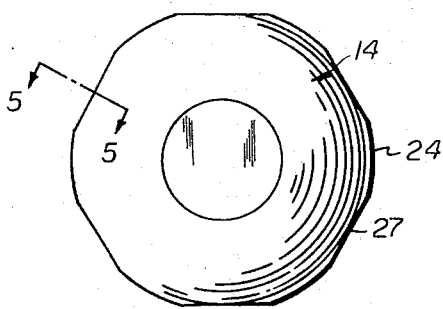
FIG. 1 is a top plan view of a locking bolt embodying the present invention.
Figure 3:
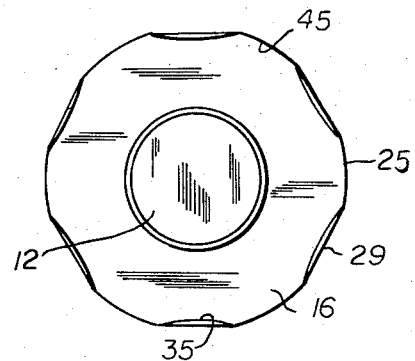
FIG. 3 is a bottom plan view of the locking bolt illustrated in FIG. 2.
Figure 2:
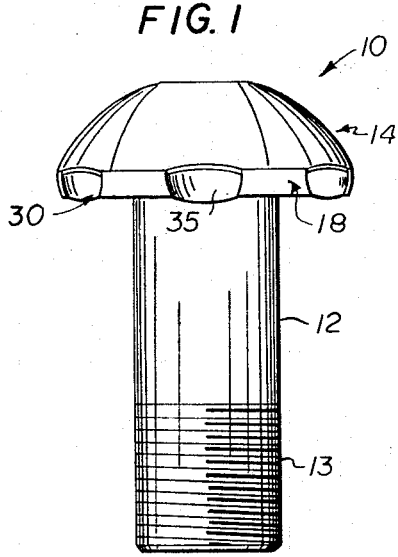
FIG. 2 is a side elevational view of the locking bolt shown in FIG. 1.

In accordance with the present invention a fastener for connecting host members, such as a pair of plates, and having a threaded end portion for receiving a nut to clamp the plates together, is provided with a head having a locking means for effecting a locking relationship with the adjacent plate when in clamping engagement therewith. The locking means comprises a plurality of peripherally spaced fins or protrusions which are formed by upsetting the periphery of the head at circumferentially spaced locations and which extend beneath the undersurface of the head. The fins or protrusions are adapted to embed within the adjacent host member and prevent the head from turning and slipping when the nut and head are moved relatively toward each other to clamp the host members together. The fins are concave, as viewed from the periphery of the head, and extend along concave arcs alternately spaced with convex arcs so as to define a head having a generally serpentine outer peripheral configuration, as viewed from the underside thereof.

In the preferred embodiment of the invention, the head of the fastener has a concave undersurface and the bearing surface of the head will be along the convex and concave arcs at the outer periphery thereof and at a maximum distance from the hole or holes of the host members which are often notch sensitive.

While the invention is susceptible for use with various types of fasteners, it is particularly suitable for use in connection with headed fasteners and for purposes of illustration is herein shown as embodied in a bolt 10. The bolt 10 comprises a stem or shank 12 having a threaded portion 13 at one end thereof and a head 14 at the other end.

The head 14, in the preferred embodiment, is generally round or radiused and has a concave bottom or undersurface 16 extending generally transversely from the shank 12. The rounded head 14 terminates in an outer peripheral surface portion 18 contiguous with the outer periphery of the undersurface 16. The outer peripheral surface portion 18 comprises a plurality of alternately spaced convex and flat or straight surfaces 25 and 27, respectively, as viewed from above the head 14 and a plurality of alternately spaced convex and concave surfaces or arcs 25 and 29, respectively, as viewed from beneath the undersurface 16 of the head. The convex arcs 25 are concentric with the shank 12 of the bolt 10, that is, they lie in a circle whose center is the axis of the bolt. The concave arcs 29 have a radius of curvature approximately equal to that of the convex arcs 25 and have centers lying outside of the periphery of the head. The alternately spaced convex and concave arcs form a generally serpentine outer peripheral configuration for the head, as viewed from the undersurface 16.

The head 14 is provided with locking means 30 for effecting a locking relationship between the bolt 10 and the adjacent host member to which it is adapted to be connected. The locking means 30 comprises a plurality of fins or protrusions 35 extending beneath or transversely of the undersurface 16 of the head 14, and along the concave arcs 29 at the outer periphery thereof. The fins 35 are inwardly concave with respect to the outer peripheral surface 18, that is, they are concave when viewed from the outer periphery of the head 14. The locking relationship between the head 14 of the bolt 10 and the adjacent host member to which it is adapted to be connected is effected by the fins 35 embedding within the adjacent host member as well as by virtue of their concave shape which provides a circumferentially facing side area, i.e., the area of the fin from the deepest point of its concavity to its juncture with the adjacent convex arc facing in a circumferential direction, resisting turning or slipping movement.

Figure 4:
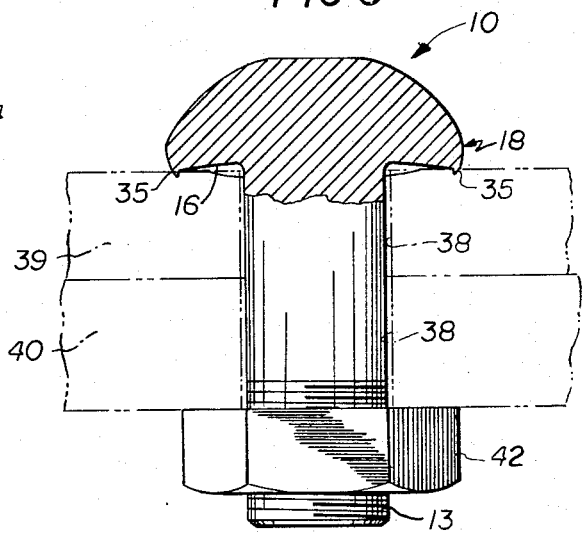
FIG. 4 is an axial sectional view with portions in elevation of the locking bolt embodying the present invention and illustrating the use of the locking bolt to connect plate members shown in dot-dash lines.

FIG. 4 illustrates one use of the bolt 10 and in this use the bolt extends through bolt holes 38 provided in a pair of plate members 39 and 40 and clampingly holds the plate members between the head 14 and a nut 42 applied to the threaded stem portion 13. It is apparent that as the nut 42 is torqued to clamp the plates 39, 40 the fins 35 will embed within the plate 39. The fins 35 because of their concave shape and the embedding action prevent any turning or slipping movement to take place between the head 14 and the adjacent plate or host member 39 and hold the bolt 10 stationary while the nut 42 is being torqued during assembly. Moreover, since the fins 35 are spaced along the outer periphery of the bolt head, the moment resisting turning movement is at a maximum value.

The underside 16 of the head 14 is preferably concave and, for such a head, the bearing surface, designated by the reference numeral 45, will be located along the convex and concave arcs at the outer periphery thereof. A concave undersurface is especially desirable if the bolt 10 is to be used for high structural strength applications because the bearing surface 45 will be at a maximum distance from the bolt hole within the adjacent host member thereby insuring that the compressive stress exerted against the host member will be at a maximum distance from the bolt hole which may be extremely notch sensitive.

The fins or protrusions 35 are very thin or knife-like in cross-section and extend only a short distance beneath the undersurface 16 of the head 14 with the distance being greatest at the midportion of the concave arcs 29 and diminishing toward the ends thereof. The thin or knife-like characteristic of the fins 35 facilitates the ease with which they will cut into and embed within the host material. Moreover, since the fins 35 are thin in cross-section and extend only a short distance beneath the head, the volume of protruded metal is small and limited to that which is necessary to provide the locking action required. This limited volume of protruded metal also insures that a proper seat between the bolt head and the host member will be effected. If the volume of the protruded metal were too large the metal may prevent the head from fully seating upon assembly and the head may further embed causing a loosening of the joint during service under the effect of an additional service load, especially if vibratory conditions exist.

If the material of the host or plate members should be harder than the material of the bolt, the fins 35 will not embed within the adjacent host member but will wipe off and away. By providing a concave undersurface 16 for the head 14, the head 14 is loaded at its outer periphery along the convex and concave arcs 25 and 29, respectively, and the moment between the center of the shank 12 and the outer convex arcs is such that even though the fins or projections are wiped out, an adequate resistance to head turning is provided.

By providing a head 14 having an outer peripheral surface comprised of alternately spaced convex and flat surfaces, 25 and 27, when viewed from above the head, an ordinary wrench may be applied to opposing flat surfaces of the head to hold the head stationary while the nut 42 is being applied or torqued to clamp the host members in the event that resistance to nut torquing is encountered as the result of the threaded portion of the shank having thread burrs thereon, or if the material has inherent galling properties such as the use of aluminum nut and bolt or a galvanized steel nut and bolt combination.

When a nut is turned and torqued to secure the bolt 10 to the host members and if the material of the host members is harder than the material of the bolt, the fins or sharp protruding metal 35 under the head will be quickly wiped out. However, if turning of the head 14 takes place during assembly, the flats 27 provided by the bolt head will enable the bolt to be held to provide turning resistance.

Figure 6:
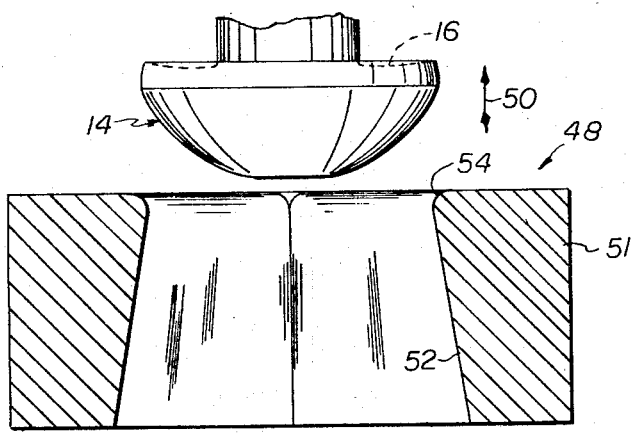
FIG. 6 is an enlarged sectional view of the die means taken along line 6—6 of FIG. 5 and illustrating the operational relationship of the die means with respect to a round head bolt.
Figure 5:
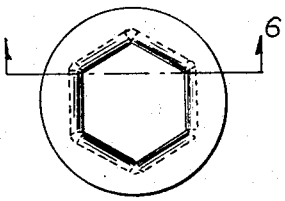
FIG. 5 is a plan view of a die means.

The fins or protrusions 35, preferably, comprise metal which has been swaged or cold flowed from the outer periphery of the head 14 adjacent the bearing surface 45 at peripherally spaced apart locations. One convenient method for forming the fins 35 is by the use of a die means 48 and a suitable press apparatus in which the die means and the bolt 10 are axially movable relative to each other, as indicated by the arrow 50 in FIG. 6, so that the die means engages the other periphery of the bolt head at circumferentially spaced locations to swage or cold flow metal therefrom. The die means 48 comprises a die member 51 having a polygonal axially tapered opening 52 extending therethrough. All of the sides of the polygonal opening 52 are radiused or rounded at the edge or end 54 of the member 51 where the opening 52 is the smallest. The flat surfaces, concave arcs and fins 35 are formed by moving the head 14 through the small end 54 of the die means 48 and engaging the sides of the opening 52 with the outer periphery of the bolt head 14 adjacent the undersurface thereof to swage or cold flow metal therefrom.

While the number of sides formed in the outer periphery of the bolt may be varied it is preferably formed so as to have at least 12 sides, that is, six convex arcs and six concave arcs, as viewed from the undersurface. By providing at least a 12-sided outer peripheral configuration, the outer periphery will approach the configuration of the circle and provide bearing surfaces and locking means which are disposed at a maximum distance from the center or axis of the bolt. Moreover, the load carrying capacity of the bolt will not be significantly decreased.

From the foregoing, it can be readily seen that a bolt having a novel locking means has been provided and wherein the concave fins, as viewed from the periphery of the head of the bolt, are readily formed by metal which is cold flowed by upsetting the periphery of the head with a die means relatively movable in an axial direction past the head.

Although the locking bolt of this invention has been illustrated and described herein to a somewhat detailed extent, it will be understood, of course, that the invention is not to be regarded as being limited correspondingly in scope but includes all changes and modifications coming within the terms of the claims hereof.

Having described my invention, I claim:

1. A one-piece bolt for connecting a pair of host members having holes for receiving the bolt, said bolt having a shank which is to be received in the holes, a threaded portion disposed at the forward end of said shank to extend outwardly of the holes in said host members, to receive a nut to apply clamping pressure to said host members, an enlarged head at the end of said shank remote from said threaded portion having a bearing surface for engaging the adjacent host member, said bearing surface tapering inwardly toward said shank at an acute angle therewith to define a concave surface, said head being comprised of alternate convex and flat surfaces when viewed from above said head, said head having a peripheral configuration of alternately spaced convex and concave arcs when viewed from the bearing surface and a radially inwardly concave fin extending along each of the concave arcs and projecting axially beneath the bearing surface thereof and being directed slightly inwardly toward said shank, said fins embedding in the adjacent host member to provide a locking engagement therewith when said head and nut are in clamping engagement with said host members.

2. A one-piece bolt for connecting a pair of host members having holes for receiving the bolt, said bolt having a shank which is to be received in the holes, a threaded portion disposed at the forward end of said shank to extend outwardly of the holes in said host members to receive a nut to apply a clamping pressure to said host members, an enlarged head having a concave undersurface at the end of said shank remote from said threaded portion and a bearing surface at its outer periphery for engaging said host member, said head having a peripheral configuration of alternately spaced convex and concave arcs when viewed from the bearing surface and a radially inwardly concave fin extending along each of the concave arcs and projecting beneath the bearing surface thereof and substantially axially of the shank, said fins embedding in the adjacent host member to provide a locking engagement therewith when said head and nut are in clamping engagement with said host members.

3. A bolt according to claim 2 wherein said head is comprised of alternate convex and flat surfaces when viewed from above said head.

4. A fastener for connecting a pair of host members and having a pair of relatively movable members provided with bearing surfaces for engaging said host members to clamp the host members therebetween when said movable members are relatively moved toward each other, one of said movable members having a plurality of annularly spaced fins about the periphery thereof extending substantially axially and projecting beyond the bearing surface thereof and toward the adjacent host member, said fins being concave when viewed from the outer periphery of said one member in the plane of the bearing surface thereof and embedding in the adjacent host member to provide a locking relationship therewith when said movable members are in clamping engagement with said host members.

5. A one-piece fastener for connecting a host member having a hole therein for receiving the fastener and another member, said fastener comprising a shank provided with a threaded portion and which is adapted to be received in said hole and an enlarged head at one end of the shank provided with a bearing surface for engaging the adjacent host member, said head having a plurality of spaced peripherally extending fins extending substantially axially beneath and transversely of the bearing surface thereof, said fins being concave when viewed from the periphery of the head in the plane of the bearing surface and embedding within the adjacent host member to effect a locking relationship therewith when the head is clampingly engaged with the adjacent host member.

References Cited by the Examiner

UNITED STATES PATENTS

| | | | |
|---|---|---|---|
| 1,827,628 | 10/1931 | Twedell | 85—9 |
| 1,864,211 | 6/1932 | Olson | 151—37 |
| 1,933,737 | 11/1933 | Kaufman | 10—27 |
| 1,934,752 | 11/1933 | Wilcox | 10—27 |
| 2,770,998 | 11/1956 | Schwartz | 85—9 |
| 2,833,326 | 5/1958 | Knohl | 151—37 |
| 2,959,204 | 11/1960 | Rigot | 151—37 |
| 3,181,584 | 4/1965 | Borowsky | 151—37 |

CARL W. TOMLIN, *Primary Examiner.*

R. S. BRITTS, *Assistant Examiner.*